United States Patent [19]

Jamali

[11] Patent Number: 5,768,414
[45] Date of Patent: Jun. 16, 1998

[54] SEPARATION OF TOUCHING CHARACTERS IN OPTICAL CHARACTER RECOGNITION

[75] Inventor: Hamadi Jamali, Redwood City, Calif.

[73] Assignee: Canon Kabushiki Kaisha, Tokyo, Japan

[21] Appl. No.: 577,727

[22] Filed: Dec. 22, 1995

[51] Int. Cl.$^6$ .................................................. G06K 9/62
[52] U.S. Cl. .................................... 382/173; 382/178
[58] Field of Search .............................. 382/177–179, 382/279, 173

[56] References Cited

U.S. PATENT DOCUMENTS

| | | | |
|---|---|---|---|
| 5,048,100 | 9/1991 | Kuperstein | 382/226 |
| 5,440,651 | 8/1995 | Martin | 382/173 |
| 5,500,905 | 3/1996 | Martin et al. | 382/157 |
| 5,542,006 | 7/1996 | Shustorovich et al. | 382/173 |

*Primary Examiner*—David K. Moore
*Assistant Examiner*—Stephen Brinich
*Attorney, Agent, or Firm*—Fenwick & West LLP

[57] ABSTRACT

Method and apparatus for separating touching characters within an optical character recognition (OCR) computer (1). An input document (20) is scanned by scanner (2), forming a set of scan line's (3). A segmentation process (4) is performed on the scan lines (3) to create a set of segmented image boxes (5). Candidate characters within the image boxes (5) are classified by a classification module (6), based upon a library of stored models (7). When the candidate characters have high degree of confidence, they are classified and coded into a binary form (8), such as ASCII. Those candidate characters that are not classified are processed by a touching character decision module (9) to determine whether a series of separation modules (10–14) is to be invoked. The execution of modules (10–13), followed by the reexecution of modules (4) and (6), may or may not cause all of the touching characters to be separated. Any touching characters that remain are subjected to one or more reprocessing cycles. The reprocessing can entail examination (14) of adjacent scan lines (3), shifting of separation threshold T by separation threshold determination module (10), or re-execution of deconvolution step (12) with changed parameters or structure.

20 Claims, 6 Drawing Sheets

SEPARATION OF TOUCHING CHARACTERS IN OPTICAL CHARACTER RECOGNITION

TECHNICAL FIELD

This invention pertains to the field of optical character recognition (OCR) computers, and, more particularly, to OCR computers that have the capability of separating scanned characters that are touching.

BACKGROUND ART

The process of optical character recognition (OCR) entails the computerized analysis of an input document that has been optically scanned by a scanner, in order to determine what characters appeared on the input document. The input document may have been produced by printing. The printing and scanning steps can produce distortions that sometimes result in the appearance that some of the characters being analyzed are touching. This makes it difficult for the OCR computer to determine the proper identities of these characters.

Reasons for touching characters are many and varied. Printer-originated touching characters can include printer spread function effects, ink splashing, printer noise, mechanical blockage, dust spots, and low printer resolution. Scanner-originated touching characters can include scanner spread function effects, noise due to scanner motion, and poor resolution. Other instances of touching characters can be caused by font design, e.g., characters that have been designed to touch or be very close to each other. Any or all of the above factors may interrelate with each other in such a way as to cause a high percentage of touching characters. For example, it is not uncommon to have a 20% incidence rate of touching characters when a 600 dpi (dot per inch) text is scanned at 400 dpi. This can wreak havoc with attempts to perform intelligible OCR.

Prior art methods to compensate for touching characters have been crude and have focused on either ignoring the touching, finding an adequate local separation threshold, or in designing templates comprising combinations of characters that are likely to touch. These methods are based on trial and error. They usually fail in many common fonts where the intensity level resulting from a thin stroke in a character is lower than that resulting from an area where two characters touch. In addition, the known methods have a classification module which operates on binary images only. This limits the accuracy level that can be reached. The present invention is capable of producing image boxes 5 in both binary and greyscale formats.

DISCLOSURE OF INVENTION

The present invention is a method and apparatus for separating touching characters within an optical character recognition computer (1). A scanner (2) scans an input document (20), creating an array of numerical values. Each row of values in this array is referred to as a scan line (3). A segmentation process (4) operates on the set of scan lines (3) to create a set of connected components image boxes (5). For each scan line (3) in these boxes (5), a separation threshold (T) is determined (10). A deconvolution process (12) is applied to each scan line (3). Each scan line (3) is binarized (13) using its separation threshold (T) to create a set of processed scan lines. The segmentation process (4) is applied to the set of processed scan lines to create a new set of segmented image boxes (5). A classification operation (6) is performed on the new set of segmented image boxes (5) to create a binarized representation (8) of the input document (20).

BRIEF DESCRIPTION OF THE DRAWINGS

These and other more detailed and specific objects and features of the present invention are more fully disclosed in the following specification, reference being had to the accompanying drawings, in which:

FIG. 6b shows that the current invention results in correct separation of touching characters, for the same example that gave rise to FIG. 6a.

DETAILED DESCRIPTION OF THE PREFERRED EMBODIMENTS

Figure 1:
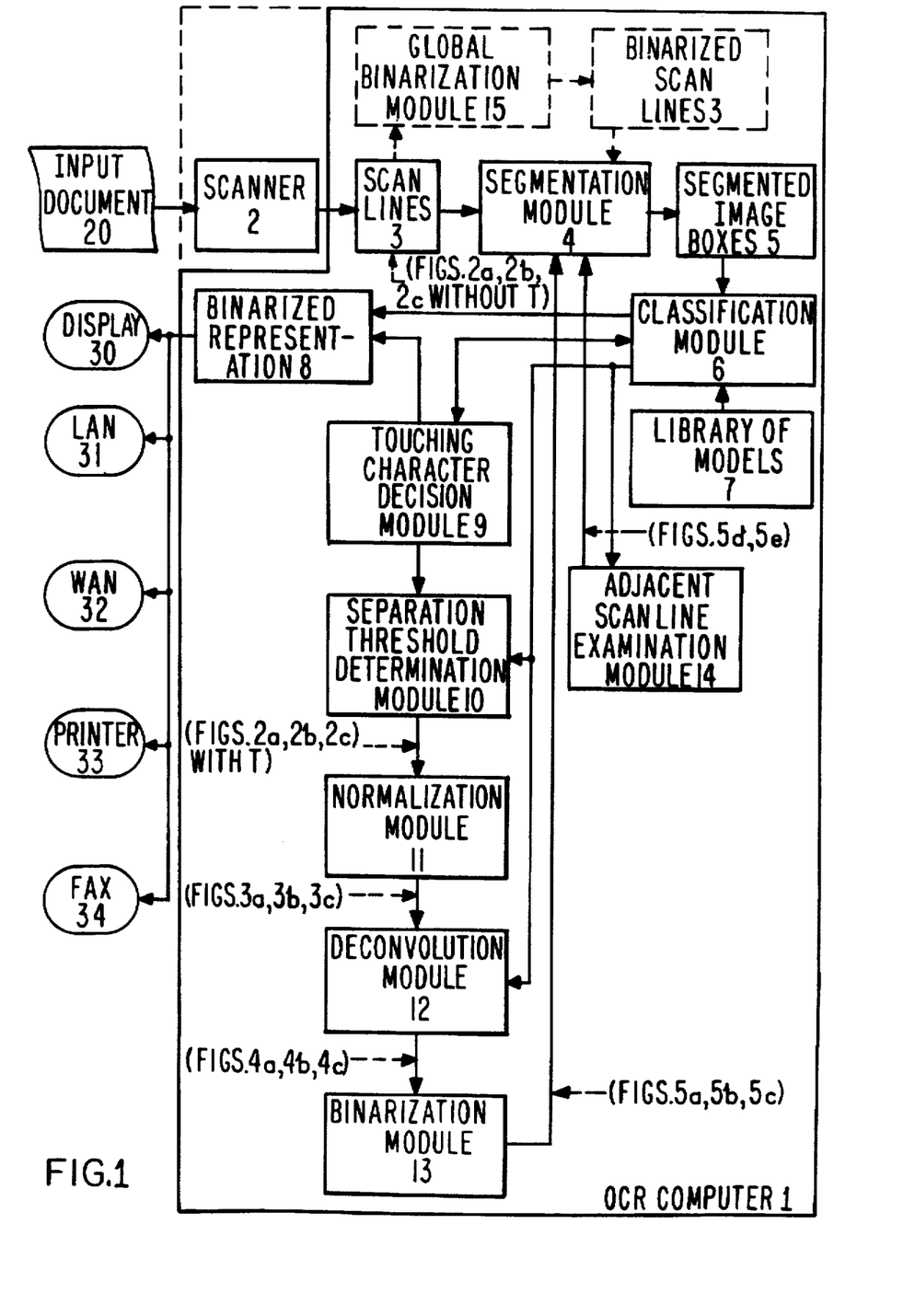
FIG. 1 is a block diagram of an OCR computer 1 employing the present invention.

An input document 20, which might be, for example, a page of paper having alphanumeric characters printed thereon, is scanned by an optical scanner 2. As illustrated herein, scanner 2 is a greyscale scanner, but other scanners, such as full color scanners, may be employed. Scanner 2 may be part of optical character recognition (OCR) computer 1, or it may be a physically separate unit. Because of these two possibilities, scanner 2 is shown partially enclosed within dashed lines in FIG. 1.

The output of scanner 2 is an array of numerical values which could be viewed as a set of scan lines 3, each of which illustrates greyscale level as a function of horizontal position along the page 20. The number of scan lines 3 per character on page 20 varies as a function of character size, scanner 2 resolution, etc., and is typically about 60 scan lines per character in size 12 typefaces.

The number of levels of greyscale varies based upon the characteristics of scanner 2, and is typically 256. With such a greyscale resolution, we assume, without loss of generality, that level 255 represents pure black while level zero represents pure white.

Figure 2A:
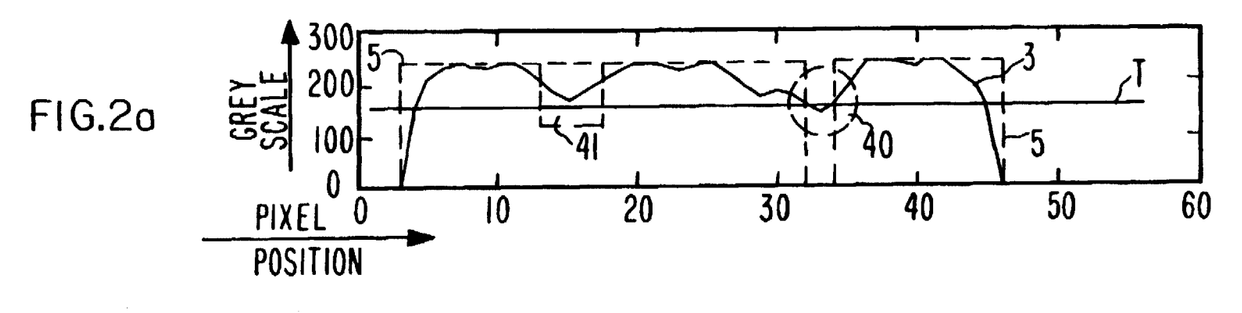
FIGS. 2a, 2b, and 2c are illustrations of three exemplary scan lines 3, showing greyscale as a function of pixel position, as augmented by module 10 of the present invention.
Figure 2B:
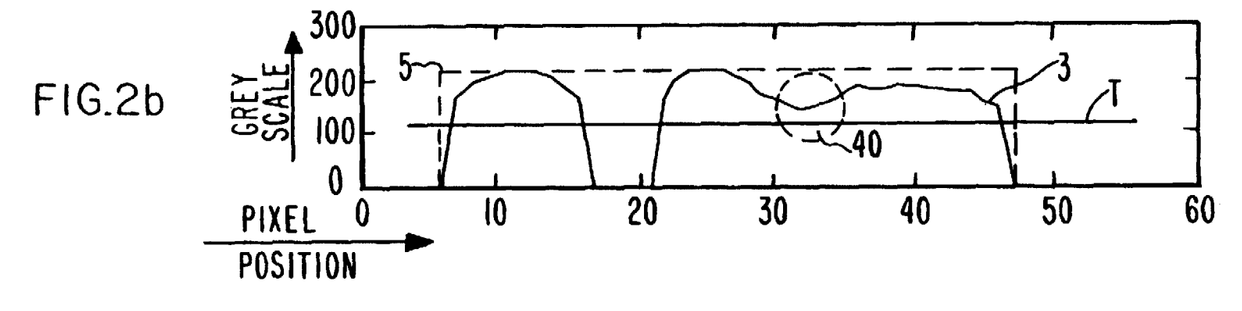
Figure 2C:
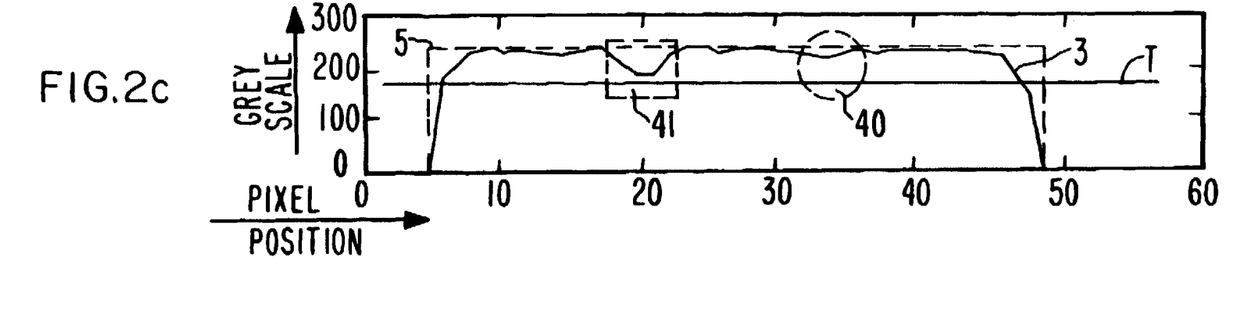

Three exemplary scan lines 3 are illustrated in FIGS. 2a, 2b, and 2c. FIG. 2a illustrates a scan line 3 with a weak merge 40, and its separation threshold T. FIG. 2b illustrates a scan line 3 with a moderate merge 40, and its separation threshold T. FIG. 2c illustrates a scan line 3 with a strong merge 40, and its separation threshold T.

The horizontal axes in FIGS. 2a, 2b, and 2c correspond to the horizontal axis of page 20, and are broken up into a discrete number of pixels, depending upon the resolution of scanner 2. Each of the scan lines 3 in FIGS. 2a, 2b, and 2c is taken from a pair of touching characters. The boxed regions 41 represent areas of thin strokes within the characters. The encircled regions 40 represent the area where the two characters touch. These regions 40 are sometimes referred to as merges or "pixel bridges", and are defined as regions between characters where the level of greyscale never drops, even for a single pixel, to zero.

The rows of the original clean pixel matrix image corresponding to the scan lines 3 of FIGS. 2a, 2b, and 2c, although not normally available, are illustrated in FIGS. 2a, 2b, and 2c as a series of dashed lines 5. The dashed greyscale 255 plateaus (for segmented image boxes 5) illustrated in FIGS. 2a, 2b, and 2c represent different strokes in the characters, although it will be appreciated that in other scan lines, these plateaus could represent the whole character. The original pixels had a greyscale value of either 0 or 255, but were distorted by one or more of the processes described above in the section entitled "Background Art". For example, the original pixel matrix could have been created on a computer; when said computer printed the characters onto document 20, a first set of distortions appeared. A second set of distortions appeared when page 20 was scanned by scanner 2.

The pixel bridge 40 illustrated in FIG. 2a is considered a weak bridge, because the highest level of greyscale in the bridge 40 is less than that of the lowest level of greyscale in any character stroke. The pixel bridge 40 illustrated in FIG. 2b is considered to be a moderate bridge 40, because the highest level of greyscale in the bridge 40 is in the same order of magnitude as that of the lowest level of greyscale in some parts of the characters. The pixel bridge 40 of FIG. 2c is considered to be a strong bridge 40, because the level of greyscale in the bridge 40 is very close to the highest level of greyscale in the image and is noticeably higher than the level of greyscale in some thin strokes of the characters. Notice from FIG. 2a that the weak bridge 40 (also known as the weak merge 40) can be resolved by the scan line separation threshold T. The moderate merge 40 can also be resolved using a threshold whose value is just above that of the separation threshold T of the corresponding scan line 3 if the image contains no thin stroke whose greyscale level is lower than that of the moderate bridge 40. This is not possible, for example, if the scan lines 3 of FIGS. 2a and 2b came from the same image. The strong merge 40 cannot successfully be resolved by simple thresholding. Having a different separation threshold T for each line 3 provides a unique reference on which this line 3 is handled. This allows us to resolve bridges 40 of different magnitude even though they existed in the same image, as is the case usually.

As in a conventional OCR process, scan lines 3 are fed as an input to segmentation module 4, which breaks up the set of scan lines 3 into a set of segmented image boxes 5 surrounding items that are candidates to be classified as characters. Depending on the need of the user, these image boxes 5 contain either binary or greyscale images. If scanner 2 does not contain a built-in binarizer, the scan lines 3 that are outputted by scanner 2 are passed through global binarization module 15 to be binarized. In that case, segmentation module can operate on either greyscale scan lines 3 or binarized scan lines 3. If characters are touching, however, the segmented image boxes 5 do not surround individual characters, but rather surround groups of characters that are touching. For the case illustrated in FIG. 2c, a single box 5 surrounds two characters.

The next step in the OCR process is that of classification. It is performed by classification module 6, which examines the segmented image boxes 5 and compares them with a predefined library of models 7 corresponding to actual characters. The classification module 6 can be based on any recognizable features of the characters. For example, the classification module 6 can be a template matching module. In this case, the library of models 7 consists of template images of the actual characters. In another example, the classification module 6 can be based on some reduced vector of selected values from the image. In this case, the library of models 7 consists of similar vectors representing the actual characters. Other choices are also possible. In addition, the classification module 6 can operate on either binary or greyscale images contained in boxes 5. Each classification method has a degree of closeness or similarity, based upon which a decision about a match is made. This is referred to as the degree of confidence of the classification method.

The classification module 6 decides whether one of the candidate characters surrounded by a box 5 is a known character, based upon the degree of closeness (similarity) between said candidate character and one of the models stored within library 7. For the case of template matching, for example, the degree of similarity is often expressed as a correlation coefficient. A coefficient of 1 indicates a perfect match, and a coefficient of 0 indicates no match at all. A correlation coefficient of greater than 0.94 is considered good, and results, in most OCR systems, in an affirmative decision that the candidate character is a character from the set of templates 7. Such an affirmative decision normally results in a binarized representation of the character being stored within storage area 8. The binary code used to create binary representation 8 may be any binary code, such as ASCII. The binarized representation 8 may be manipulated by the user of OCR computer 1, or it may be passed as an output from computer 1 to any one or more of a number of possible output devices, including, without limitation, display 30, local area network 31, wide area network 32, printer 33, and facsimile machine 34.

For those candidate characters that exhibit a very low degree of confidence, classification module 6 passes control to touching character decision module 9. Module 9 preferably executes a series of steps to verify that the low degree of similarity is indeed representative of two or more touching characters, and is not caused by something else, such as a single character that doesn't have a corresponding model in library 7.

The verification steps performed by module 9, like all of the steps performed by modules 4, 6, and 9-14, can be embodied in software, hardware, firmware, or some combination thereof. In the hardware embodiment, modules 4, 6, and 9-14 can be executed by a single processor within computer 1. Alternatively, one or more of such modules 4, 6, and 9-14 may have its own dedicated processor.

The verification steps typically include checking the overall size of box 5, the horizontal position of box 5 within scan line 3, and the number of pixels within box 5. If these checks (which are made by comparing these parameters against a set of baseline parameters stored within module 9) indicate the presence of two or more touching characters, control is passed to the module which is to be executed next. This module is normally separation threshold determination module 10, but may also be deconvolution module 12.

If, on the other hand, the verification steps suggest that the candidate character is an unknown character, rather than two or more touching characters, a binary representation of the unknown character is passed to binary representation storage area 8.

Storage area 8, as well as storage areas holding scan lines 3, segmented image boxes 5, and library of models 7, may be any storage area used with computers, such as a floppy disk, a hard disk, a magnetic memory, an optical memory, a bubble memory, etc.

Separation threshold determination module 10 is normally executed prior to deconvolution module 12, but may be executed after deconvolution module 12. When optional normalization module 11 is invoked, both of modules 10 and 11 are executed prior to module 12.

The purpose of module 10 is to determine, for each scan line 3, a separation threshold T expressed in greyscale level. A greyscale level above T is deemed to be representative of a character, a portion (stroke) of a character, or a pixel bridge 40 between touching characters; whereas a greyscale level below T is deemed to be a region of separation between characters or between portions of the same character.

Each scan line 3 may be assigned its own unique T. This is known as dynamic threshold determination. This has the advantage of providing a unique reference against which said scan line 3 is processed individually, resulting in more flexibility in handling merges with different degrees of severity in the same image. On the other hand, the same T may be used for all of the scan lines 3 within document 20. This is known as static threshold determination.

Threshold level T may be some arbitrary number, such as greyscale level 100. Alternatively, T may be calculated as the average greyscale level of the scan line 3. This average level is sometimes referred to as the "center of mass". The center of mass may be multiplied by a preselected factor, such as 0.9, to determine T, depending upon the font or set of related fonts.

Figure 3A:
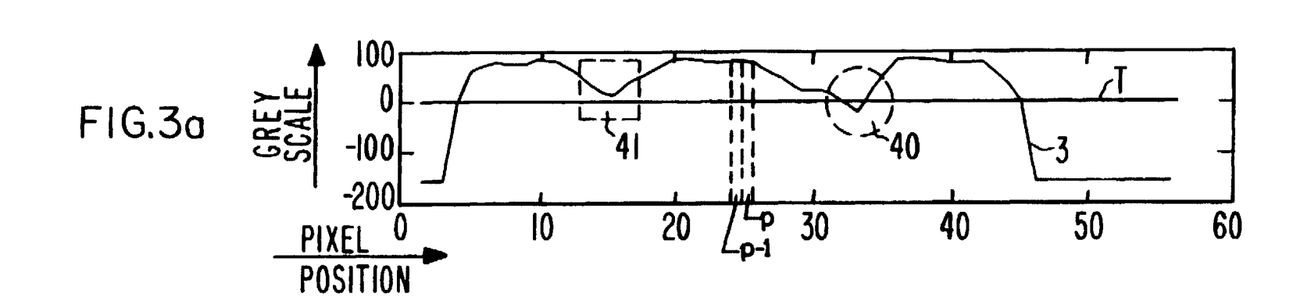
FIGS. 3a, 3b, and 3c are illustrations of the scan lines 3 of FIGS. 2a, 2b, and 2c, respectively, after they have been processed by module 11.
Figure 3B:
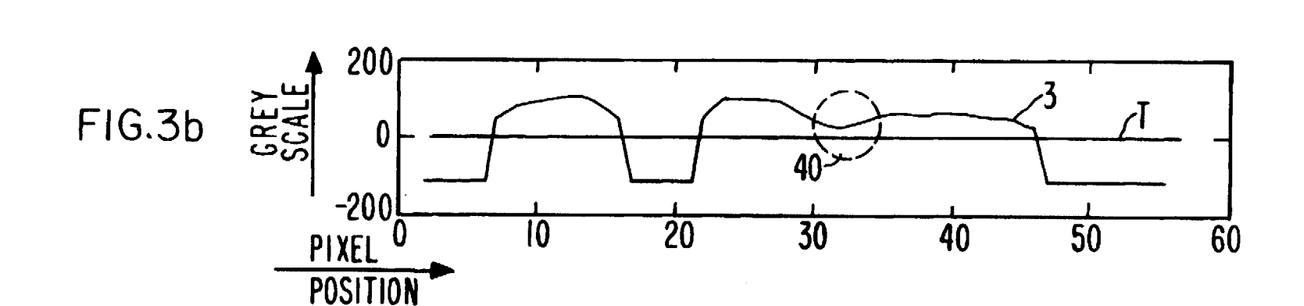
Figure 3C:
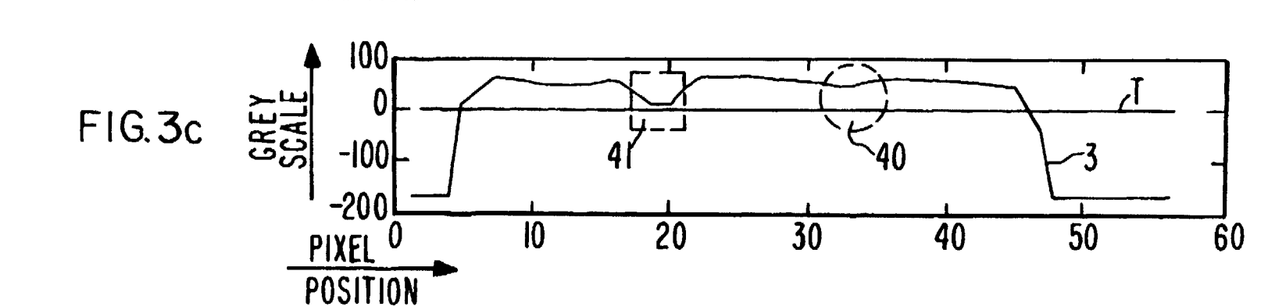

After the threshold T has been determined for each scan line 3 by module 10, normalization module 11 is normally (but not necessarily) invoked. The purpose of normalization step 11 is to simplify the calculations performed by deconvolution module 12. In the normalization step, the vertical (greyscale) axis for each scan line 3 is rescaled, so that level T is reset to be a greyscale level of 0. This results in the situation that pixels falling above T have positive rescaled greyscale levels, and pixels falling below level T have negative rescaled greyscale levels. The output of module 11 is shown in FIGS. 3a, 3b, and 3c, corresponding to the scan lines 3 illustrated in FIGS. 2a, 2b, and 2c, respectively.

Figure 4A:
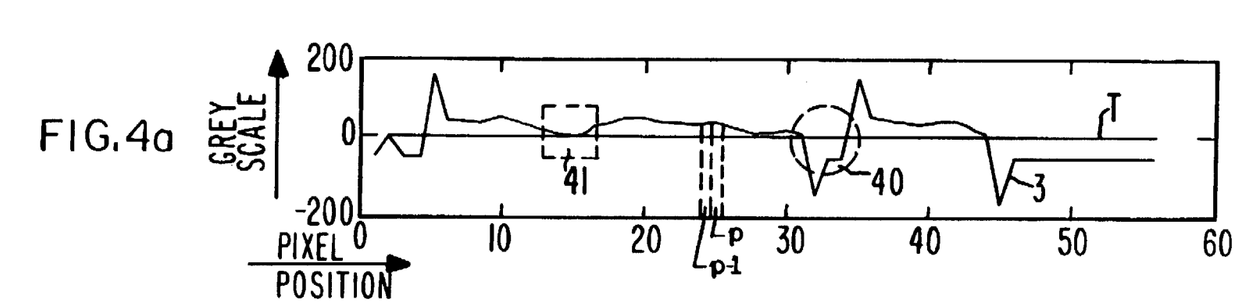
FIGS. 4a, 4b, and 4c are illustrations of the scan lines of FIGS. 3a, 3b, and 3c, respectively, after they have been processed by an elementary one-dimensional moving average multiply-add deconvolution module 12.
Figure 4B:
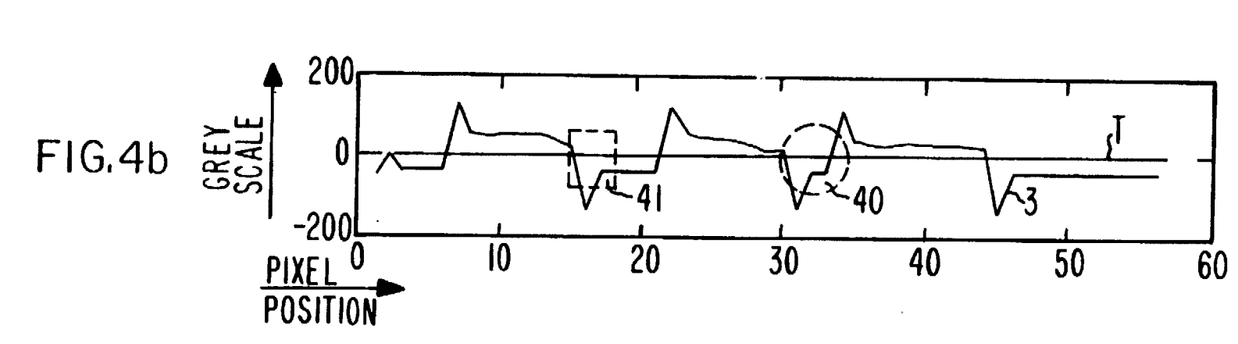
Figure 4C:
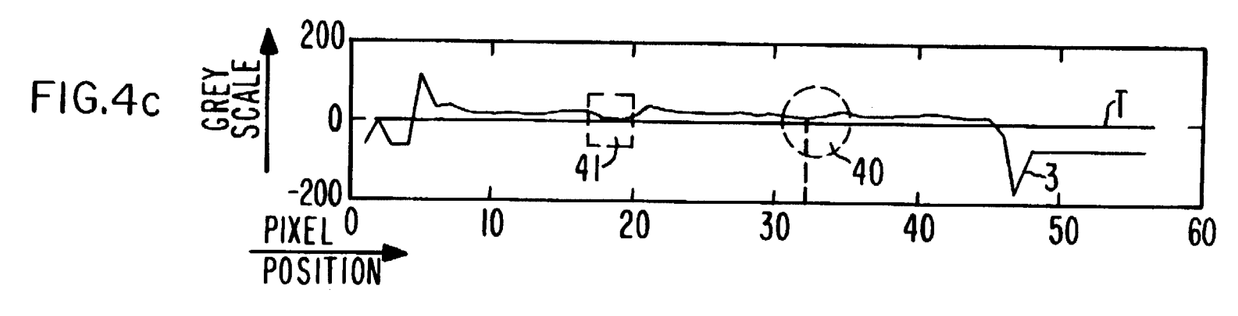

Deconvolution module 12 applies a deconvolution function f against each scan line 3. The purpose of this is to attempt to reverse, as much as possible, the effects of the spreading functions that created the pixel bridges to begin with. The output of module 12 is illustrated in FIGS. 4a, 4b, and 4c, corresponding to FIGS. 3a, 3b, and 3c, respectively. Function f is typically a multiply-add deconvolution function. Function f may be a moving average function, an autoregressive function, or an autoregressive moving average function. Function f could also be a two-dimensional version of any of the above filter structures, which version could be applied to a number of scan lines 3 at a time. Such functions f are font sensitive. For example, in a simple moving average function, only two pixels are used: pixel p and pixel p−1 (see FIGS. 3a and 4a). For each such pixel pair, a new value of greyscale for each pixel p is calculated by function f as the weighted average of the original greyscale levels of pixel p and pixel p−1. For example, the new value for pixel p may be its old value minus 0.6 times the value of pixel p−1. Such a moving average function enhances the contrast of scan line 3, by increasing the greyscale values of the darker pixels and decreasing the greyscale values of the lighter pixels. Notice that even for such an elementary multiply-add filter, the level of greyscale in a moderate bridge 40 has fallen below zero, indicating a successful separation, as illustrated in FIG. 4b.

An optimum function f having any of the structures described above can be calculated from the data in an adaptive manner. This requires setting up an optimization mechanism for carrying out the update of the filter coefficients. This optimization mechanism could be based on either the standard least mean squares error criterion or any of the nonlinear variations of it, such as the constant modulus error criterion. Also, for the type of printers and scanners that are currently on the market, a nominal and fixed parameters function f from the family of structures outlined earlier may suffice. An embodiment that we particularly prefer for its simplicity, speed of operations, and performance is for the multiply-add filter deconvolution function to be:

$$Y_p = f(y_p) = y_p + ay_{p-1}$$

where $Y_p$ is the calculated level of greyscale at the pixel position p in the scan line 3

$y_p$ is the actual level of greyscale at the pixel position p in the scan line 3

$y_{p-1}$ is the actual level of greyscale at the pixel position to the left of position p a is usually −0.06 but could be different if the printer or the scanner 2 changes.

The purpose of binarization module 13 is to characterize all of the pixels in stark black or white terms. In the binarization process, those pixels that have been subjected to the deconvolution function f that lie above threshold T are set to have the maximum greyscale value, which in this case is 255. Deconvolved pixels that lie beneath level T are set to have a greyscale level of 0.

Figure 5A:
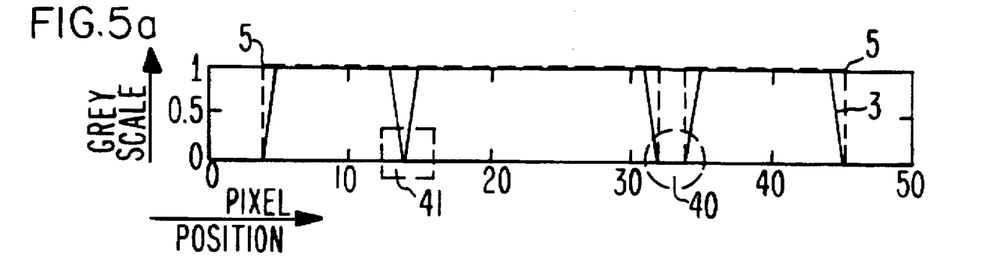
FIGS. 5a, 5b, and 5c are illustrations of the scan lines of FIGS. 4a, 4b, and 4c, respectively, after they have been processed by binarization module 13.
Figure 5B:
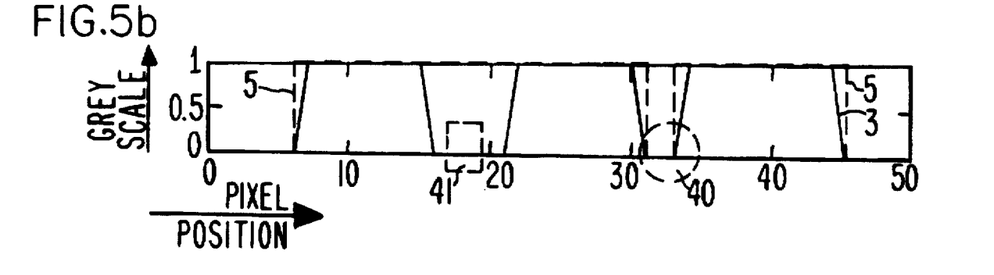
Figure 5C:
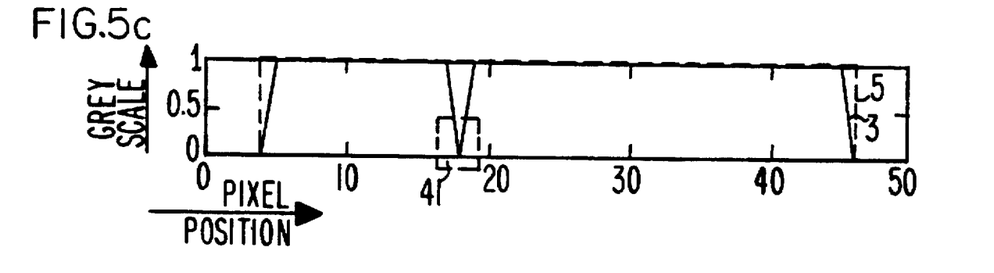

The output of binarization module 13 is illustrated in FIGS. 5a, 5b, and 5c, corresponding to FIGS. 4a, 4b, and 4c, respectively. As illustrated in FIGS. 5a and 5b, the application of binarization module 13 after an elementary first order moving average multiply-add process 12 has resulted in weak and moderate pixel bridges 40 being resolved successfully (their level of greyscale set to zero). Strong pixel bridges 40 under the same scenario, on the other hand, are set to 255, indicating that a touching character remains, as shown in FIG. 5c.

The output of binarization module 13 is fed to segmentation module 4, which creates a new set of segmented image boxes 5. If the classification module 6 is of the type that operates on binary images 5, then the image boxes 5 are made up of scan lines 3 of the type in FIG. 5d. On the other hand, if the classification module 6 works with greyscale images 5, then the image boxes 5 are made up of scan lines 3 of the type in FIG. 5e. In the examples illustrated, segmentation module 4 draws two boxes 5 around the greyscale characters corresponding to the images of scan lines 3 in each of FIGS. 5a and 5b, using the dimensions extracted from the resulting binary images. Each of these boxes 5 contains a single character image. The parameters extracted from the binary image of scan lines 3 of FIG. 5c, on the other hand, result in only one box 5 encompassing two touching characters. Classification module 6 then compares these new segmented image boxes 5 against the library of models 7. In the example illustrated, the first two candidate characters are classified as known characters, are binarized, and are sent to binarized representation storage area 8. A pair of touching characters remains, however, as classification module 6 verifies by consulting touching character decision module 9. At this point, classification module 6 determines that some reprocessing is necessary. There are three reprocessing embodiments, as described below.

In the first reprocessing embodiment, which is preferred, classification module 6 passes control to adjacent scan line examination module 14. Module 14 operates on the prebinarized set of scan lines 3 of the sort illustrated in FIGS. 4a, 4b, and 4c. Module 14 examines groups of adjacent scan lines 3 at the vicinity of the same horizontal (pixel) position p* along scan line 3 (see FIG. 4c). This horizontal position is any position where a pixel bridge 40 is suspected. In the illustrated example, assuming the scan lines 3 are taken from the same image and are adjacent, module 14 examines some or all of the scan lines 3 at and in the vicinity of positions 14 through 18 and 31 through 33 (boxed 41 and encircled 40 regions, respectively).

One way of implementing module 14 is to program module 14 to make the decision that when just a small percentage (say, less than 10%) of the greyscale levels of pixel p* for all the examined scan lines 3 indicates a connection (pixel bridge), the overall greyscale level at position p* is set to 0. Otherwise, the overall greyscale level at position p* is set to 255. In the example, FIGS. 4a, 4b, and 4c show that the level of greyscale at and in the vicinity of pixel positions 14 through 18 has fallen to zero or below it in all three scan lines 3, indicating that this position represents a legitimate white space. However, in the vicinity of pixel positions 31 through 33, only two of the three scan lines 3 have seen their level of greyscale drop below zero (FIGS. 4a and 4b). In the example, we may choose to set to zero the level of greyscale at positions 31 through 33 in FIG. 4c, also indicating that we believe this to be a bridge 40. In real situations, all the scan lines 3 at both positions are processed before arriving at such a conclusion.

Figure 5D:
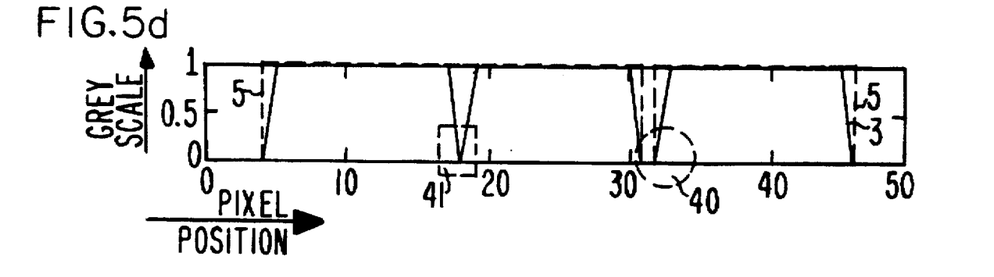
FIG. 5d is an illustration of the scan line 3 of FIG. 3c after it has been processed by adjacent scan line examination module 14 and binarization module 13.
Figure 5E:
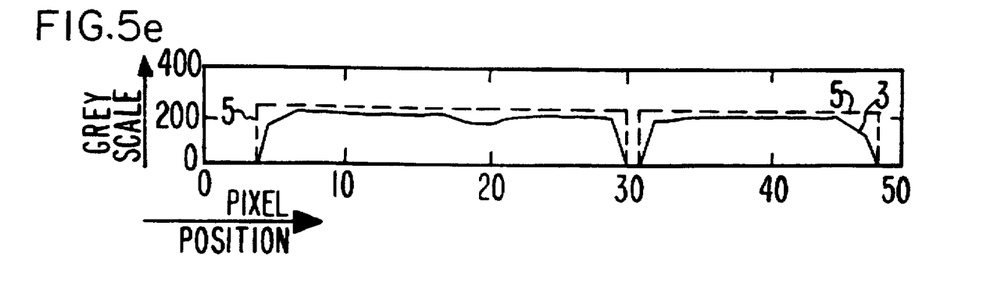
FIG. 5e is an illustration of the original scan line 3 of FIG. 2c with the pixel bridge 40 removed.

As a refinement of this method, module 14 is programmed to examine neighboring pixels when making its decision concerning whether the level of pixel p* is set to 0 or 255. For example, positions p*+1 and p*–1 are also examined. A weighted average is then taken. For example, position p* can be given twice as much weight as each of positions p*+1 and p*–1. The overall greyscale level for all three positions for all examined scan lines 3 is then calculated. If this average greyscale level falls below a certain preselected level (which may be level T or some function of T), the greyscale level at position p* is set to 0; otherwise, it is set to the maximum level of 255. FIG. 5d illustrates the results of this implementation of module 14 with our example. FIG. 5e illustrates the type of scan lines 3 outputted by the segmentation module 4 portrayed as boxes 5, if the classification module 6 requires greyscale images 5.

After reprocessing has been performed by module 14, control is passed back to segmentation module 4, and processing continues as before.

In the second reprocessing embodiment, classification module 6 passes control to separation threshold determination module 10, which repositions T (in FIGS. 2a, 2b, and 2c) so that T is just above the lowest greyscale level of that pixel bridge 40 which is closest to T but above T. This is equivalent to repositioning level zero in FIGS. 4a, 4b, and 4c. In the example illustrated in FIGS. 4a, 4b, and 4c, such "lowest dip" appears at pixel p*. Thus, module 10 repositions T to be just above the original greyscale level at pixel p*, or equivalently, repositions level zero in FIGS. 4a, 4b, and 4c just above the level of p*. After reprocessing has been performed by module 10, control is passed to normalization module 11, or to deconvolution module 12, as before.

In the third reprocessing embodiment, classification module 6 passes control to deconvolution module 12. Module 12 is reexecuted until the lowest dip (at position p*) falls below level T (below zero in the output of module 12). This can be accomplished by changing the weights within deconvolution function f, including more pixels in the calculations within function f, etc. After reprocessing has been performed by module 12, control is passed to binarization module 13 as before.

After the reprocessing step, segmentation module 4 produces another set of segmented image boxes 5, which are compared with library of models 7 by classification module 6. The reprocessing step may be performed one time, an arbitrary preselected number of times, or until all of the touching characters have been separated, as desired.

Figure 6A:
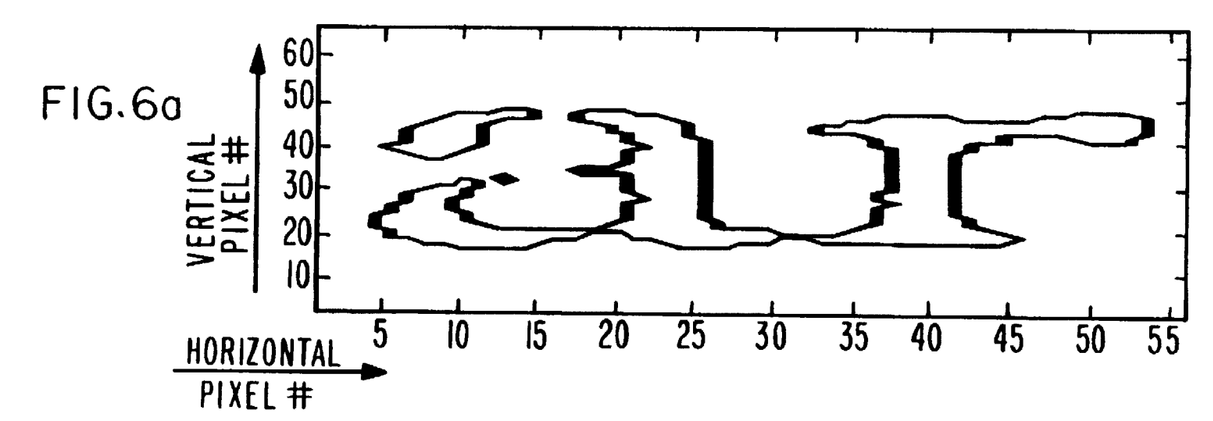
FIG. 6a illustrates a typical case where conventional intensity-based methods fail.
Figure 6B:
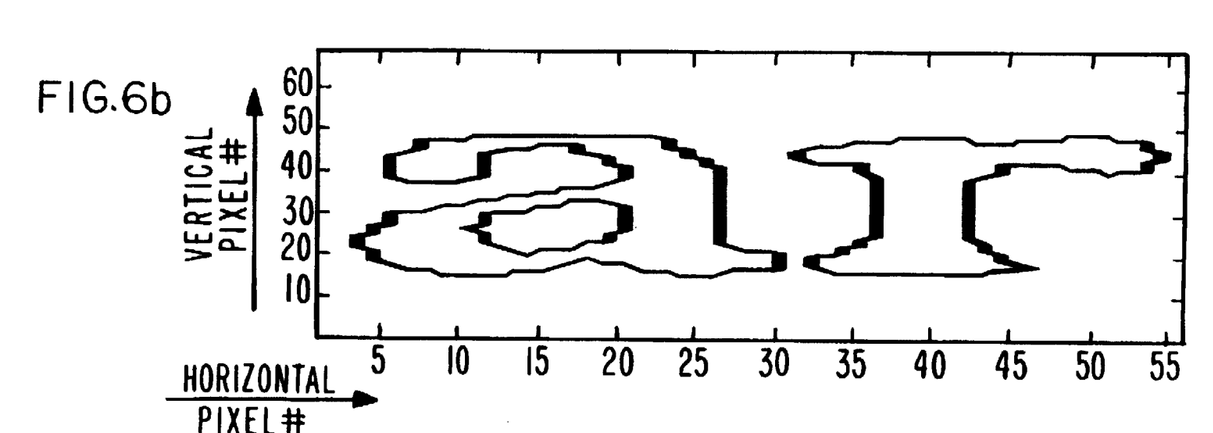

FIG. 6a is a rendition of a printed output of an image after it has been processed by conventional optical character recognition methods. Note that the characters "a" and "r" have not been successfully separated, owing to a strong merge. FIG. 6b illustrates an output at printer 33 after the same input document 20 as in FIG. 6a has been processed by OCR computer 1 of the present invention. Note that the present invention has successfully separated the characters "a" and "r", and has retained greater integrity in character "a".

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention. For example, the preferred embodiments have been illustrated in conjunction with a greyscale scanner 2. The invention can be equally used with a color scanner, except that all of the processing is done in three dimensions rather than one dimension.

What is claimed is:

1. A computer-implemented method for separating touching characters within an optical character recognition computer, said method comprising the steps of:

inputting a set of scan lines created by optically scanning a document;

performing a segmentation process on the set of scan lines to create a set of segmented image boxes;

for each scan line, determining a separation threshold;

deconvolving each scan line with a deconvolution function;

binarizing each scan line using its separation threshold to create a set of processed scan lines;

performing the segmentation process on the set of processed scan lines to create a new set of segmented image boxes; and performing a classification operation on the new set of segmented image boxes to create a binarized representation of the input document.

2. The method of claim 1, wherein the inputting step is performed by an optically greyscale scanner.

3. The method of claim 1 further comprising, after the step of determining a separation threshold, a step of normalizing each scan line with respect to its separation threshold.

4. The method of claim 1 wherein the step of determining a separation threshold is performed before the deconvolving step.

5. The method of claim 1 wherein the step of determining a separation threshold is performed after the deconvolving step.

6. The method of claim 1 wherein the deconvolution function is a multiply-add moving average function.

7. The method of claim 1 wherein the deconvolution function is a multiply-add autoregressive function.

8. The method of claim 1 wherein the deconvolution function is a multiply-add autoregressive moving average function.

9. The method of claim 1 wherein the deconvolution function is a multiply-add moving average function.

10. The method of claim 1 wherein the deconvolution function is a multiply-add autoregressive function.

11. The method of claim 1 wherein the deconvolution function is a multiply-add autoregressive moving average function.

12. The method of claim 1 wherein the separation threshold is the same for each scan line.

13. The method of claim 1 wherein each scan line has its own separation threshold.

14. The method of claim 1 wherein, after the step of performing a classification operation, a step of deciding whether there are any remaining touching characters is performed.

15. The method of claim 14 wherein, when there are any remaining touching characters, a reclassifying step is performed.

16. The method of claim 15 wherein the reclassifying step comprises examining adjacent scan lines at the same horizontal (pixel) position to determine whether a touching should be broken.

17. The method of claim 15 wherein the reclassifying step comprises moving a separation threshold to break a touching.

18. The method of claim 15 wherein the reclassifying step comprises re-executing the deconvolving step with different parameters.

19. An optical character recognition computer comprising:

means for inputting a set of scan lines created by optically scanning a document;

a segmentation module having an input coupled to the set of scan lines;

a classification module coupled to an output of the segmentation module;

a binarization module coupled to an input of the segmentation module;

a deconvolution module coupled to an input of the binarization module; and a separation threshold determination module coupled to the deconvolution module.

20. A computer-readable medium containing a computer program for separating touching characters within an optical character recognition computer, said program, when executed, performing the steps of:

inputting a set of scan lines created by optically scanning a document;

performing a segmentation process on the set of scan lines to create a set of segmented image boxes;

for each scan line, determining a separation threshold;

deconvolving each scan line with a deconvolution function;

binarizing each scan line using its separation threshold to create a set of processed scan lines;

performing the segmentation process on the set of processed scan lines to create a new set of segmented image boxes; and performing a classification operation on the new set of segmented image boxes to create a binarized representation of the input document.

* * * * *